March 8, 1960 — S. C. MOON — 2,927,681
CONVEYOR IDLER STAND
Filed Aug. 5, 1957
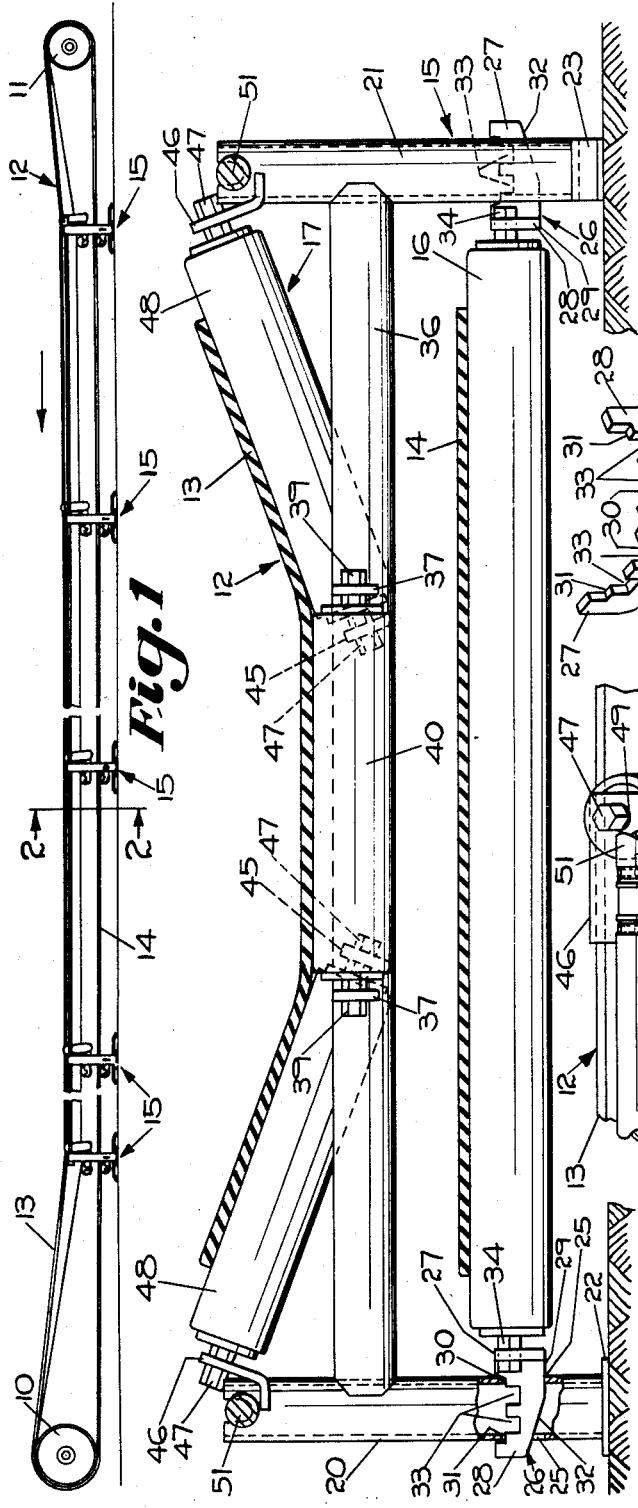
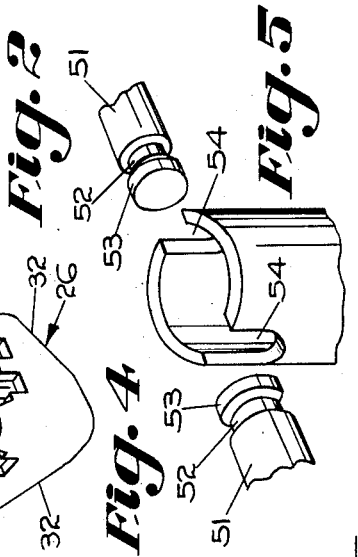
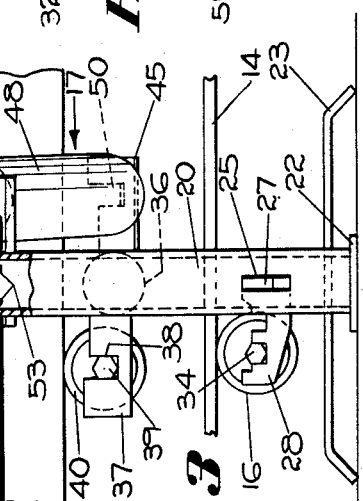
INVENTOR;
STERLING C. MOON,
BY David Young
ATT'Y.

United States Patent Office 2,927,681
Patented Mar. 8, 1960

2,927,681

CONVEYOR IDLER STAND

Sterling C. Moon, Dublin, Ohio, assignor to The Jeffrey Manufacturing Company, a corporation of Ohio Application August 5, 1957, Serial No. 676,209

2 Claims. (Cl. 198—184)

The instant invention relates to endless belt conveyors, and more particularly to an improved idler stand for use in guiding and supporting the runs of the conveyor belt in such a conveyor.

It is the prime object of the instant invention to provide an improved idler stand for use in an endless belt conveyor to support the runs thereof.

It is a further object of the instant invention to provide for use in a conveyor an improved idler stand having brackets for supporting an idler roll, which brackets may be readily assembled and disassembled on the idler stand.

It is another object of the instant invention to provide an improved idler stand structure, including a troughing idler formed by three idler rolls arranged one in the center on a substantially horizontal axis, with the other two idler rolls being arranged on either side thereof on axes which are inclined upwardly and outwardly with respect to the axis of the center idler roll.

It is still another object of the instant invention to provide an improved idler stand structure for supporting the runs of a conveyor belt, including means spacing the idler stands along the length of the conveyor and maintaining the idler stands in an upright position.

Other objects of the invention will appear hereinafter, the novel features and combinations being set forth in the appended claims.

In the accompanying drawings:

Fig. 1 is an elevational view of an endless belt conveyor incorporating the idler stands of this invention;

Fig. 2 is a sectional view taken on the line 2—2 in Fig. 1 and showing the idler stand of the instant invention;

Fig. 3 is a side elevational view of the idler stand of the instant invention;

Fig. 4 is a perspective view of a bracket for supporting a return idler roll; and Fig. 5 is a perspective view showing the connection of the rods to the idler stands.

Referring to Fig. 1 there is illustrated an endless belt conveyor comprising a head pulley 10 and a tail pulley 11, disposed at opposite ends of the conveyor for supporting and guiding the endless conveyor belt 12 at the ends of the conveyor, the conveyor belt 12 being trained about the peripheries of the head and tail pulleys 10, 11. It will be understood by those skilled in the art that the head and tail pulleys 10, 11 may be supported by any appropriate supporting structure, and one or both of the pulleys 10, 11 may be driven for the purpose of operating the conveyor belt 12. Since this structure forms no part of the invention and may take any suitable form known to the art, it is not illustrated in the drawings.

The conveyor belt 12 comprises a load carrying run 13 operating along the top of the conveyor and traveling from the tail pulley 11 towards the head pulley 10. At the bottom of the conveyor is the return run 14 of the conveyor belt 12 and it, of course, operates in the opposite direction from that of the load carrying run 13. Between the head pulley 10 and the tail pulley 11 the runs 13, 14 of the conveyor belt 12 are supported by a plurality of idler stands 15 which are disposed at equally spaced intervals along the length of the conveyor. The idler stands 15 are all identical and comprise a straight idler roll 16 disposed adjacent the bottom of the idler stand 15 for supporting and guiding the return run 14 of of the belt 12. At the top of the idler stand 15 there is provided a troughing idler 17, which guides and supports the load carrying run 13 of the conveyor belt 12, and forms the load carrying run 13 into a transversely troughed configuration to center the load on the conveyor belt 12 and to thus eliminate spillage of the material from over the edges of the belt 12.

Each idler stand 15 comprises a pair of upright columns 20, 21 disposed one at either side of the conveyor belt 12. Each of the columns 20, 21 is formed from tubular material, which may be ordinary pipe, and which has sufficient strength to support the loads imposed on the idler stand 15. The column 20 has secured to the bottom thereof a flat base member 22 formed from a square piece of plate, which serves to support the column 20 on the ground. The opposite column 21 has a foot member 23 secured to the bottom thereof, and which extends to either side of the column 21. The foot member 23 extends a substantial distance forwardly and rearwardly of the idler stand 15, and serves to maintain the idler stand 15 in an upright position.

Near the bottom of each of the columns 20, 21 there is provided a pair of aligned slots 25 in the opposite sides of the column, the two slots 25 in each of the columns 20, 21 providing a slot opening that extends clear through the column. A bracket 26 is adapted to be received in the slots 25 of each of the columns 20, 21.

The bracket 26 comprises a pair of identical legs 27, 28 which are disposed at right angles to each other, and are symmetrical about the center axis of the bracket 26, which axis coincides with the junction of the legs 27, 28. The bracket 26 is locked in the slots 25, which are formed in each of the columns 20, 21, thereby retaining the bracket 26 in assembly with the columns 20, 21. Each leg 27, 28 of the bracket 26 comprises a flat bottom surface 29 and a parallel flat land 30 which fit in a slot 25. A shoulder 31 on each leg 27, 28 abuts against the outer surface of a column 20, 21 adjacent to one of the slots 25, and this shoulder 31, in combination with the surface 29 and the land 30, serves to retain the bracket 26 in assembly with the columns 20, 21.

In order to remove a bracket 26 from the slots 25, the bracket 26 is tilted in a counterclockwise direction, as viewed at the left hand side of Fig. 2. The bracket 26 is so dimensioned with respect to the slots 25, that there is sufficient room to permit such pivoting of the bracket 26. The surface 32 at the bottom of each of the legs 27, 28 of the bracket 26, is inclined to provide the necessary clearance for tilting and withdrawing the bracket 26 from the slots 25 in each of the columns 20, 21. Between the land 30 and shoulder 31 on each leg 27, 28 of the bracket 26, there is formed a pair of adjacent notches 33 which are adapted to receive and support the axle 34 of a straight idler roll 16. In the illustrated embodiment the axle 34 has a hexagonal cross section, and two sides thereof abut the sides of a notch 33, so that the axle is held fixed in the notch 33, while the idler roll 16 rotates on the axle 34. A pair of notches 33 is provided in each leg 27, 28 of the bracket 26 so that the idler roll may be so disposed to extend transversely at right angles to the conveyor belt 12 or, if necessary, the idler roll 16 may be placed at a slight angle to the longitudinal centerline of the conveyor belt 12 to train the return run 14 of the conveyor belt 12.

A short distance below the tops of the columns 20, 21 there is disposed a transversely extending tubular member 36, which is secured to the columns 20, 21, as by welding or the like, and with the columns 20, 21 forms a frame for the idler stand 15 having an H configuration. At one side of the tubular member 36 there is provided a pair of brackets 37, which are spaced from each other and extend transversely with respect to the tubular member 36. Each of the brackets 37 comprises a notch 38 which is adapted to receive the axle 39 of an idler roll 40. The axle 39 has a hexagonal cross-section so that the axle 39 will fit into the notch 38 with two surfaces thereof abutting the sides of the notch 38, so that the axle 39 will be non-rotatably secured in the notch 38. At the opposite side of the tubular member 36 there is provided a pair of brackets 45, which extend transversely from the tubular member 36 and are disposed substantially opposite to the brackets 37. The brackets 45 are inclined with respect to the vertical, and are aligned with and disposed parallel to the plane of a pair of brackets 46 which are secured adjacent the top of the columns 20, 21. Each pair of brackets 45, 46 is adapted to receive and support the axle 47 of an idler roll 48. The bracket 46 comprises a circular aperture 49 for the axle 47 and the brackets 45 each comprise a notch 50 for the reception of the hexagonal end of the axle 47 to non-rotatably retain the same.

The idler rolls 48 extend upwardly and outwardly from approximately the ends of the idler roll 40, and these three idler rolls together constitute a troughing idler which forms the load carrying run 13 of the conveyor belt 12 into a longitudinally troughed configuration, so that the load will be centered upon the conveyor belt 12 to eliminate spillage of the material. The inclined idler rolls 48 have their axes disposed at a slight angle to a line extending at right angles to the longitudinal centerline of the conveyor belt 12, as seen in Fig. 3, whereby the idler rolls 48 exert a training effect on the load carrying run 13, tending to maintain it centered with respect to the idler rolls 48 and with respect to the idler stand 15 generally.

The idler stands 15 are disposed along the length of the conveyor belt 12 between the head pulley 10 and the tail pulley 11 at equally spaced intervals. Rigid rods 51 extend between the adjacent columns 20, 21 on successive idler stands 15, and are secured thereto to maintain the idler stands at equally spaced intervals along the length of the conveyor and to prevent accidental tipping of the idler stands 15. Each end of the rod 51 is peripherally notched to form a neck 52 and a head 53. The top of each of the columns 20, 21 on the idler stands 15 is formed with a pair of oppositely disposed notches 54 of such size that they snugly fit the neck 52 on the ends of the rods 51. When setting up the idler stands 15 along the length of the conveyor, the rods 51 are secured to the tops of the columns 20, 21, and extend between adjacent idler stands 15. The necks 52 are pushed into the notches 54, and the heads 53 on the ends of the rods 51 prevent the rods from being pulled out of the notches 54 in an axial direction, and at the same time prevent any movement of the idler stands 15 in the direction of the conveyor belt 12, so that the successive idler stands 15 remain in fixed position at equally spaced intervals along the length of the conveyor belt 12.

The idler stand of the instant invention is very quickly and easily set up in the run of a conveyor. The idler rolls of the idler stand are readily separated from the frame thereof. When setting up the idler stand the idler rolls are removed, leaving the idler stand in the form of an H frame which can be readily inserted between the load carrying run and return run of the conveyor belt to put the idler stand in place along the length of the conveyor. The idler rolls can then very readily be added to the idler stand by simply placing them in position as described herein and attaching the connecting rod between adjacent idler stands to maintain them in the position in which they were set. Since it is not always required that each idler stand be provided with a return idler roll, the idler stands are provided without the return idler roll and without the brackets for supporting them. With the instant invention it becomes an extremely simple matter to add the brackets and return idler to as many idler stands as may be found to be necessary.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. In an endless belt conveyor, an idler stand for supporting the run of the conveyor belt comprising a pair of upright columns disposed one on each side of the conveyor belt, each of said columns including a slot opening, a bracket for each column including a leg adapted to be disposed in the slot opening, said leg including a shoulder adapted to abut the column and releasably lock the leg in the slot opening to hold the bracket in position, said bracket including a second leg extending transversely with respect to the first said leg, said second leg including a notch adapted to receive and support the shaft of an idler roll.

2. In an endless belt conveyor, an idler stand for supporting the run of the conveyor belt comprising a pair of upright columns disposed one on each side of the conveyor belt, each of said columns including a slot opening, a bracket for each column including a leg adapted to be disposed in the slot opening, said leg including a shoulder adapted to abut the column and releasably lock the leg in the slot opening to hold the bracket in position, said bracket including a notched portion integral with the leg adapted to receive and support the shaft of an idler roll.

References Cited in the file of this patent

UNITED STATES PATENTS

| | | |
|---|---|---|
| 2,128,309 | Madeira | Aug. 30, 1938 |
| 2,514,715 | Milik | July 11, 1950 |
| 2,592,915 | Lee | Apr. 15, 1952 |
| 2,616,552 | Duncan | Nov. 4, 1952 |
| 2,781,893 | Milik | Feb. 19, 1957 |